(12) United States Patent
Miller et al.

(10) Patent No.: US 8,610,322 B2
(45) Date of Patent: Dec. 17, 2013

(54) MAGNETIC BEARING AND METHOD FOR OPERATION THEREOF

(75) Inventors: Luitpold Miller, Ottobrunn (DE); Qinghua Zheng, Taufkirchen (DE)

(73) Assignees: ThyssenKrupp Transrapid GmbH, Kassel (DE); ThyssenKrupp Rothe Erde GmbH, Dortmund (DE)

( * ) Notice: Subject to any disclaimer, the term of this patent is extended or adjusted under 35 U.S.C. 154(b) by 521 days.

(21) Appl. No.: 13/055,258

(22) PCT Filed: Jul. 10, 2009

(86) PCT No.: PCT/EP2009/005003
§ 371 (c)(1),
(2), (4) Date: Jan. 21, 2011

(87) PCT Pub. No.: WO2010/012366
PCT Pub. Date: Feb. 4, 2010

(65) Prior Publication Data
US 2011/0127868 A1 Jun. 2, 2011

(30) Foreign Application Priority Data
Aug. 1, 2008 (DE) .......................... 10 2008 036 702

(51) Int. Cl.
*H02K 7/09* (2006.01)
*F16C 32/04* (2006.01)
(52) U.S. Cl.
USPC ........................................................ 310/90.5
(58) Field of Classification Search
USPC ........................................................ 310/90.5
See application file for complete search history.

(56) References Cited

U.S. PATENT DOCUMENTS

| | | |
|---|---|---|
| 3,860,300 A | 1/1975 | Lyman |
| 2011/0127868 A1* | 6/2011 | Miller et al. .................. 310/90.5 |
| 2012/0175985 A1* | 7/2012 | Post .............................. 310/90.5 |

FOREIGN PATENT DOCUMENTS

| | | |
|---|---|---|
| DE | 10 2006 062 420 | 12/2007 |
| EP | 0 411 697 | 2/1991 |
| FR | 2 892 780 | 5/2007 |
| JP | 8-189527 | 7/1996 |
| JP | 9-126236 | 5/1997 |

OTHER PUBLICATIONS

Roland Steffen: "Magnetlager, Prinzip und Berechnungsgrundlagen", http://www.rolandsteffen.de, 2004, pp. 1-13 (With Statement of Relevancy).

* cited by examiner

*Primary Examiner* — Tran Nguyen
*Assistant Examiner* — David Scheuermann
(74) *Attorney, Agent, or Firm* — Michael J. Striker

(57) ABSTRACT

The invention relates to a magnetic bearing and to a method for operation thereof. The magnetic bearing contains a ferromagnetic, movably mounted bearing element (1) and at least two magnetic devices (3o, 3u) arranged on opposing sides of the bearing element (1) and equipped with windings (6), wherein during operation of the magnetic bearing, electric currents are conducted through the windings (6) and these currents are regulated such that in an equilibrium state between the bearing element (1) and the two magnetic devices (3o, 3u), bearing gaps (10o, 10u) of predetermined size (So, Su) form. According to the invention, the temperatures produced in the magnetic devices (3o, 3u) during operation are measured and the regulation of the currents takes place such that in the equilibrium state, regardless of the load situation, the same temperatures appear in the magnetic devices (3o, 3u) or in the windings (6) thereof (FIG. 1).

16 Claims, 2 Drawing Sheets

MAGNETIC BEARING AND METHOD FOR OPERATION THEREOF

Figure 1:
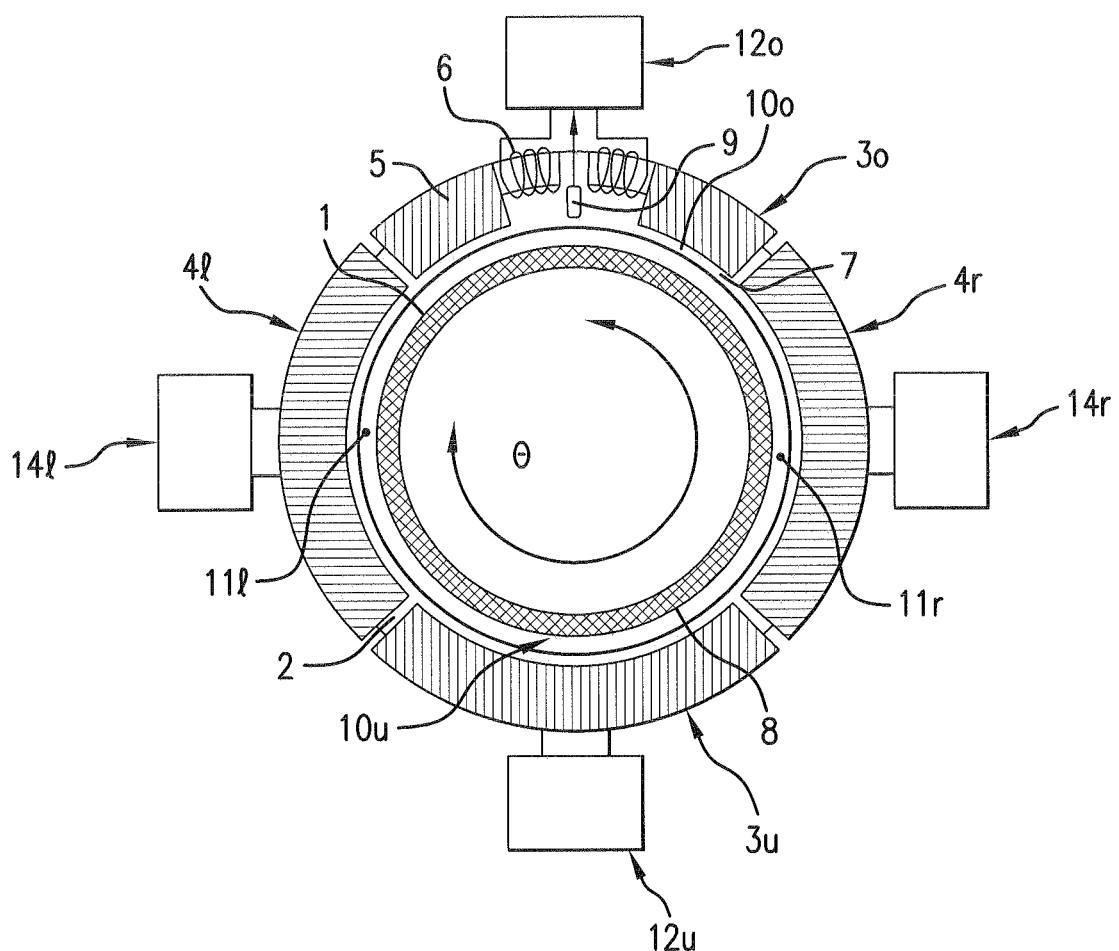

The method relates to a method for the operation of a magnetic bearing according to the preamble of claim 1 and a magnetic bearing of the type indicated in the preamble of claim 7.

Magnetic bearings, which can be designed as radial bearings or axial bearings, and methods for the operation thereof according to the types described above are known in numerous variants (e.g. Roland Steffen in "Magnetlager, Prinzip and Berechnungsgrundlagen", 2004, http://www.rolandsteffen.de).

Radial bearings of this type are used primarily for the contactless, radial support of rotary bodies with the aid of bearing elements in the form of circular bearing rings mounted thereon. They are characterized by the fact that they operate without wear and require no lubricant. Preferred fields of application are therefore vacuum technology and medical technology. Magnetically supported heart pumps for heart surgery are known, for instance. In addition, such magnetic bearings are also used e.g. in machine tools, wind power installations, or medical scanners.

The contactless support of the bearing rings is implemented in that the radial distances thereof from the magnetic devices on which they are mounted, which are distributed in the circumferential direction thereof and are designed as electromagnets, are ascertained continuously using sensors, the actual values obtained are compared with setpoint distance values, and the resultant differential values are supplied to a control circuit and are used to regulate the currents in the windings of the magnetic devices such that the actual distance values remain substantially constant and assume preselected magnitudes.

Magnetic bearings are designed as axial bearings in an analogous manner. In this case, for example, a bearing element inserted onto a shaft is disposed between at least two axially interspaced magnetic devices in order to define the axial position of the shaft by regulating the sizes of the resultant bearing gaps.

A common feature of the magnetic bearings described is that they require high running accuracy e.g. to ensure that a medical scanner provides images that are sharp and reproducible. Until now these running properties have been influenced mainly by the fact that the bearing elements are manufactured with high precision and that an aim is to keep the size of bearing gaps located on opposite sides of the bearing element as identical as possible during operation with the aid of feedback control. This applies regardless of whether they are radial bearings or axial bearings or combinations thereof.

During operation of magnetic bearings of this type, it has been shown, however, that the temperature development in the magnetic devices or the windings thereof does not play an insignificant role, particularly in cases involving large bearings having bearing rings, the diameter of which is e.g. 500 mm, in particular 1000 mm and more, as is desired e.g. for the application of magnetic bearings in medical scanners: Provided that such bearings are loaded evenly and the bearing gaps should be identical in size everywhere, in particular on opposite sides of the bearing element, the magnetic devices have substantially the same current consumption and, therefore, substantially the same temperatures. However, if the magnetic bearings are loaded unevenly, e.g. if pressure increases on one side in a machine tool, if the wind strength fluctuates in a wind power installation, or the equilibrium conditions change in a scanner due to an unbalanced position, a weight displacement or the like, then due to the requirement that opposing bearing gaps should be identical in size, this inevitably makes it necessary to operate opposing magnetic devices using different electrical currents, in order to fulfill this requirement. The result, in particular in the case of magnetic bearings having large dimensions, is that correspondingly varied local temperature fluctuations caused by the electrical power losses in the windings occur, which results in varied thermal expansions of the bearing elements or magnetic devices, thereby greatly inhibiting exact feedback control of the gap, if not rendering it impossible.

Proceeding therefrom, the technical problem addressed by the current invention is that of designing the initially described magnetic bearing and method for the operation thereof such that substantially even temperature distributions result under all operating conditions.

This problem is solved by the characterizing features of claims 1 and 7.

The invention is based on the idea of regulating the currents flowing through the windings of the magnetic devices primarily such that substantially such electrical currents are supplied to the windings of opposing magnetic devices that the occurrence of different temperatures is prevented, even when the mechanical load on the magnetic bearing changes. The fact that the bearing gaps on opposite sides of the bearing element can change slightly as a result is accepted. However, since electrical gap feedback control operates using a very small time constant, while a potential temperature change takes effect slowly, the size of opposing bearing gaps also changes gradually, which can be tolerated for the purpose of most applications. Additionally the advantage results that this also applies when the bearing elements or magnetic devices heat up differently—for whatever reason—due to external temperature conditions.

Further advantageous features of the present invention will be apparent from the dependent claims.

Figure 2:
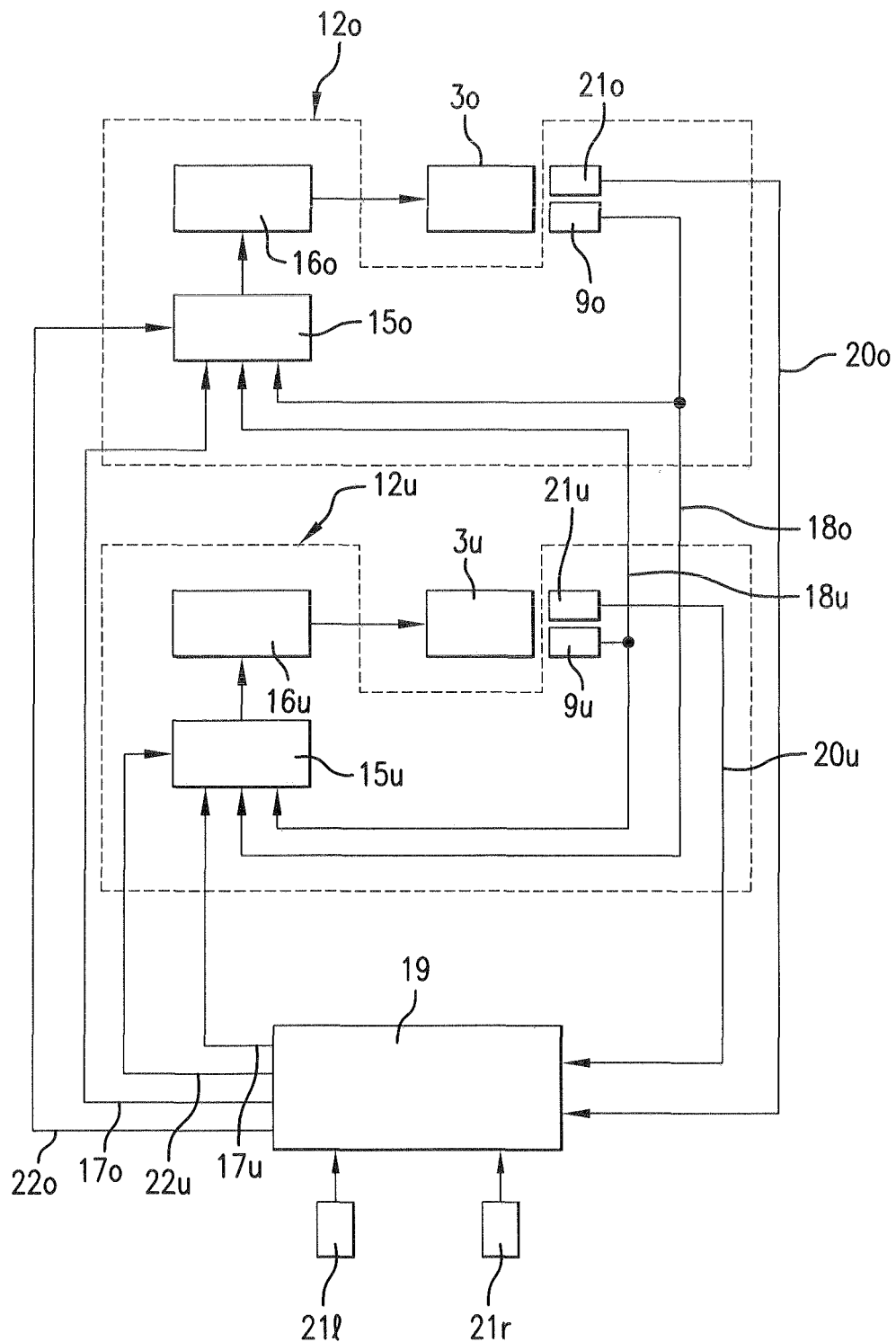

The present invention is explained below in greater detail with reference to the attached drawings. In the drawings:

FIG. 1 shows a schematic depiction of a magnetic bearing, using a radial bearing as an example; and FIG. 2 shows a control device, according to the invention, for the magnetic bearing depicted in FIG. 1.

FIG. 1 is a schematic depiction of a magnetic bearing having a first bearing element 1, which is designed as inner ring and rotor and is rotatable in the direction of a double arrow θ, and a second bearing element 2 designed as outer ring and stator. Bearing element 2 is equipped with four magnetic devices 3o, 3u, 4l and 4r in the embodiment, the letters "o", "u", "l" and "r" standing for "top", "bottom", "left", and "right" for the purposes of the present invention. Magnetic devices 3o, 3u are disposed on opposite sides of bearing element 1 as are magnetic devices 4l, 4r, thereby forming two pair of diametrically opposed magnetic devices. In addition, each magnetic device 3 and 4 has a winding 6 wound around a core 5, as shown schematically in FIG. 1 only for magnetic device 3o. Magnetic-pole surfaces 7 of cores 5 are assigned to a circumferential or radial surface 8 of bearing element 1 and can have concave shapes adapted to the contour thereof, as usual. The design of magnetic devices 3o, 3u, 4l and 4r is preferably identical, and therefore only magnetic device 3o will be described in greater detail.

Bearing element 1 is composed of a ferromagnetic material and is centered and guided radially in a manner known per se by magnetic devices 3, 4. In addition, bearing element 1 can be attached e.g. on the circumference of a disk composed of a non-ferromagnetic material, in particular being shrink-fitted thereon and/or fastened to a rotary body to be supported. Preferably such a bearing element 1, which is a radial bearing, is installed on each of the two axial ends of a rotor, while a further, not-shown bearing element is disposed e.g. in a central part of the rotor, is used as an axial bearing, and is situated opposite further magnetic devices by way of circumferential edge sections of the end or axial surfaces thereof. The drive which is used to set the rotor and, therefore, bearing element 1 into rotation is likewise not shown. Common means that are known to a person skilled in the art can be used for this purpose.

FIG. 1 also shows that a preferably inductive sensor 9 is assigned to each magnetic device 3, 4, which measures the actual values of the size or width of a bearing gap or air gap that forms during operation of the magnetic bearing, i.e. during rotation of bearing element 1, between circumferential or radial surface 8 thereof and pole surfaces 7 of assigned magnetic device 3, 4. In analogy to magnetic devices $3o$, $3u$, $4l$, $4r$, the bearing gaps in FIG. 1 are labelled with reference characters $10o$, $10u$, $11l$ and $11r$.

The output signals of sensors 10 and 11 are sent to one control unit $12o$, $12u$, $14l$, $14r$, the depiction of which is simplified, and are compared with a specified setpoint value therein. The difference between the two signals is used to derive an actuating signal which is supplied to a current controller which controls the current through the applicable winding. As a result, the winding current and therefore the magnetic force acting on bearing element 1 at the site of sensor 9 is controlled such that the size of bearing gap 10, 11 substantially assumes the desired setpoint value despite any geometric imbalances in bearing ring 1. This type of feedback control is preferably the same for all magnetic devices 3, 4.

Magnetic bearings of this type and methods for the operation thereof are generally known, and are known e.g. from the above-noted publication which is therefore made subject matter of the present disclosure by reference thereto to prevent repetition.

Conventional magnetic bearings (FIG. 1) are operated such that an aim is to make the sizes of bearing gaps $10o$, $10u$ and $11l$, $11r$ exactly identical with the aid of control units 12, 14. This can be achieved—provided bearing element 1 is loaded substantially evenly during operation under nominal conditions in the direction of all magnetic devices 3, 4 present and therefore only potential imbalances or the like must be compensated—by supplying electrical currents having the same magnitude on average to windings 6 of all magnetic devices 3, 4 using control units 12, 14. As a result, all windings 6 and magnetic devices 3, 4 also assume the same operating temperatures on average. The same result can be achieved when bearing element 1 is loaded under nominal conditions more heavily in one direction or the other than in the opposite direction, e.g. due to the natural weight thereof, and opposing magnetic devices $3o$, $3u$ and/or $4l$, $4r$ are therefore designed differently in order to attain same-sized gaps even under such nominal conditions with substantially identical currents.

In contrast, if bearing element 1 is loaded in any direction more heavily than under nominal conditions, i.e. if the load situation changes compared to nominal conditions, then a stronger current must be conducted through corresponding winding 6 than through the winding opposite thereto in order to compensate for this greater load, which is associated with increased heating of applicable winding 6 or magnetic device 3, 4 due to a correspondingly greater power loss. This is unwanted for the reasons stated above and is prevented according to the invention by the mode of operation described below. It is assumed that the two opposing magnetic devices $3o$, $3u$ form a first pair of magnetic devices, and bearing gap $10o$ has size So, while bearing gap $10u$ has size Su. The currents flowing through windings 6 of magnetic devices $3o$, $3u$ under nominal conditions, i.e. in the normal case in which no unusual loads occur, are regulated according to the requirement So−Su=0. The two control units $12o$ and $12u$, which are shown in greater detail in FIG. 2, are used for this purpose.

As shown in FIG. 2, control unit $12o$ for magnetic device $3o$ shown at the top in FIG. 1 contains a gap sensor $9o$, the output signals of which—which are characteristic for the actual values of bearing gap $10o$—are supplied to a controller $15o$. The output thereof is connected to a current controller $16o$ which delivers the current to be supplied to winding 6 of magnetic device $3o$. Controller $15o$ compares the actual values of sensor $9o$ to a setpoint value supplied by way of a line $17o$ and supplies a control signal derived from the difference to current controller $16o$.

FIG. 2 furthermore shows that control unit $12u$ for magnetic device $3u$ shown at the bottom in FIG. 1 has a similar design, and therefore the components thereof are labelled using the same reference characters, although appended with the letter "u". FIG. 2 also makes apparent that the actual values of sensor $9o$ are also delivered to controller $15u$ by way of a line $18o$, and the actual values of sensor $9u$ are also delivered to controller $15o$ by way of a line $18u$.

The actual values of gaps $10o$ and $10u$ are compared with one another in controllers $15o$ and $15u$, and are converted into control signals for current controllers $16o$, $16u$ in accordance with the above-noted requirement So−Su=0. The setpoint value "0" for the difference So−Su is defined by one output each from a temperature controller 19. It comprises two inputs, to which the actual temperature values are supplied by way of lines $20o$, $20u$, the temperatures forming in magnetic devices $3o$, $3u$ or windings 6 thereof during on-going operation of the magnetic bearing and being ascertained using temperature sensors $21o$, $21u$ which are shown schematically in FIG. 2 and are connected to lines $20o$, $20u$. Temperature controller 19 compares the actual values of the two temperatures to one another and outputs one setpoint value of 0 at each of the outputs thereof, provided the actual values of the two temperature sensors $21o$, $21u$ are identical.

If the load situation changes, i.e. if bearing element 1 is loaded unevenly during operation of the magnetic bearing, starting from the nominal conditions, e.g. in that it is also drawn downward by a force in FIG. 1, or for other reasons is pressed more heavily in the direction of magnetic device $3u$ than in the direction of magnetic device $3o$, then, due to the feedback control described above, a greater current is automatically supplied to winding 6 of magnetic device $3o$ than to magnetic device $3u$ since upper magnetic device $3o$ must now exert a greater force on bearing element 1 to fulfill the condition So−Su=0. As a consequence however, as described above, upper magnetic device $3o$ or winding 6 thereof heats up to a greater extent than lower magnetic device $3u$ or winding 6 thereof, which can result in varied and therefore unwanted thermal expansions of bearing element 1, which could bring about an intolerable out-of-roundness of bearing element 1 and could disrupt the control process.

For this case it is therefore provided according to the invention that the control device be switched to the requirement So−Su=a, where a<0. This switch is carried out automatically when the actual values of the temperatures delivered by temperature sensors $21o$, $21u$ differ from one another by a certain minimum value. Requirement So−Su=a or So=Su+a with a<0 means that the size So of upper bearing gap $10o$ should be made smaller than the size Su of lower bearing gap Su. Accordingly, temperature control circuit 19 outputs appropriate signals to lines $17o$, $17u$ as setpoint values for controllers $15o$, $15u$, which then control current controllers 16*o*, 16*u* such that an equilibrium state sets in with new gap sizes So and Su+a.

Given that the size of gap 10*o* is selected to be smaller than the size of gap 10*u* in the case described, slightly less current must be supplied to winding 6 of upper magnetic device 3*o*, and slightly more current must be supplied to winding 6 of lower magnetic device 3*u* than would apply without this feedback control, thereby enabling the two magnetic devices 3*p*, 3*u* to exert the same force onto bearing element 1 in the equilibrium state. This is achieved by reaching this equilibrium state by using currents that induce identical temperatures in the two magnetic devices 3*o*, 3*u* or windings 6 thereof. In other words, the value a is selected such that the two magnetic devices 3*o*, 3*u* or windings 6 thereof assume the same temperatures on average even though gap sizes So and Su differ. According to the invention, achieving exactly identical gap sizes is therefore sacrificed in favor of obtaining temperatures that are identical, thereby ensuring that the same temperatures are obtained in magnetic devices 3*o*, 3*u* or windings 6 thereof, regardless of the special load situation.

For the rest, it is clear that winding 6 of upper magnetic device 3*o* must be operated briefly using a higher current before the equilibrium state is reached in order to pull bearing element 1 toward it in accordance with reduced gap size S1. This process takes place very rapidly, however, and has no substantial influence on the temperature of magnetic device 3*o* or winding 6 thereof.

The different gap sizes, which differ from each other by relatively little in the equilibrium state and under the changed load situation given the feedback control described above, and the minor positional deviations of bearing element 1 in bearing element 2 associated therewith are tolerable in most cases for the operation of the magnetic bearing. Since electrical gap feedback control takes place relatively rapidly (e.g. in the kHz range), while the temperature changes take effect relatively slowly (e.g. in the range of minutes), changes specified by temperature control circuit 19 are unable to have a substantial effect on the control processes to be carried out by controllers 15*o*, 15*u*.

If at least one further pair of magnetic devices 4*l*, 4*r* is present in addition to the pair of magnetic devices 3*o*, 3*u*, as shown in FIG. 1, then they and associated control units 14*l*, 14*r* are preferably designed exactly as described above for magnetic devices 3*o*, 3*u* and control units 12*o*, 12*u*. As a result, when bearing element 1 is loaded in the direction of one of the magnetic devices 4*l*, 4*r*, then identically-sized bearing gaps 11*l*, 11*r* are likewise sacrificed in favor of identical temperatures in the two magnetic devices 4*l*, 4*r* or windings 6 thereof.

According to an embodiment of the invention that has so far been considered to be the best, not only are the temperatures of respective opposing magnetic devices 3*o* and 3*u*, and/or 4*l* and 4*r* regulated to the same values, but the currents through windings 6 of all magnetic devices 3*o*, 3*u*, 4*l* and 4*r* are made to be identical on average as well. This can be achieved as shown in FIG. 2, e.g. by also supplying the actual temperature values from temperature sensors 21*l*, 21*r* of the other pair of magnetic devices 4*l*, 4*r* to temperature control circuit 19 of the pair of magnetic devices 3*o*, 3*u* described first, and by increasing or reducing the currents supplied to windings 6 of magnetic devices 3*o*, 3*u* by the same extent, i.e. without changing the control requirement So−Su=a, such that the same temperatures result as magnetic devices 4*l*, 4*r* or windings 6 thereof. One simple way to do this, for example, is to change the bias voltages of controllers 15*o*, 15*u* accordingly when the mean temperature reported by temperature sensors 21*o*, 21*u* for pair 3*o*, 3*u* deviates by a preselected amount from the mean temperature reported by temperature sensors 21*l*, 21*r* for pair 4*l*, 4*r*. The analogous approach can be used for control devices for magnetic devices 4*l*, 4*r*, which are not shown in FIG. 2.

The feedback controls described are implemented preferably using common microprocessors and a related software. Since such feedback controls and control methods are routine to a person skilled in the art, no further explanation is necessary.

Typical temperature sensors 21*o* to 21*r* are shown in FIG. 2, as means for ascertaining the temperatures. In this context, it is particularly advantageous for the operating temperatures to be ascertained indirectly instead by way of the electrical resistances of windings 6. These resistances can be ascertained e.g. on the basis of the current and voltage values—which may be known—of windings 6. Temperature can be determined on the basis of the temperature dependence of the resistances of the winding material, which is known or is determined in advance.

The present invention is not limited to the embodiments described, which could be modified in various manners. Bearing element 1, which is depicted in the embodiment as a ring or cylinder, can be designed as an inner ring, as shown in FIG. 1, or as an outer ring. In addition, the magentic bearing can be designed as an axial bearing instead of a radial bearing, and/or can be equipped with a bearing element which is supported such that it may move in a manner other than rotation. Furthermore, it is clear that magnetic devices 3*o*, 3*u*, 4*l*, 4*r* represent merely one embodiment. Actually, more or fewer than four magnetic elements can be disposed on the circumference of bearing body 1 and/or more than two pair of magnetic elements situated opposite one another can be provided. In addition, each magnetic device can be composed of a plurality of cores and windings lying next to one another in the circumferential direction of bearing element 1. Furthermore, more or fewer sensors 9 and 21, and sensors 9 and 21 that are designed and disposed differently can be provided. Moreover, the control units described can have a different design and other control strategies can be used to maintain identical temperatures in opposing magnetic devices or windings. In particular, control units 12*o*, 12*u*, 14*l*, 14*r* for all available pairs of magnetic devices and associated temperature control circuits 19 can be combined to form one common control device. For the rest, it is clear that the term "identical" used in the context of temperature, current, and bearing gaps is intended to include values that are not only identical but also substantially equal. For large bearings as well, the bearing elements of which can be subjected to considerable temperature expansions, and on which the invention is used to particular advantage, it can suffice to move the temperatures of opposing magnetic devices toward one another such that the thermal expansions remain within preselected tolerances. Finally, it is understood that the features described may also be used in combinations other than those described and depicted herein.

What is claimed is:

1. A method for operating a magnetic bearing that contains a ferromagnetic, movably supported bearing element (1) and at least two magnetic devices (3*o*, 3*u*) disposed on opposite sides of the bearing element (1) and equipped with windings (6), wherein during operation of the magnetic bearing, electric currents are conducted through the windings (6) and these currents are regulated such that in an equilibrium state between the bearing element (1) and the two magnetic devices (3*o*, 3*u*), bearing gaps (10*o*, 10*u*) of preselected size (So, Su) form, characterized in that
the temperatures produced in the magnetic devices (3o, 3u) during operation are measured and the currents are regulated such that in the equilibrium state, regardless of the load situation, the same temperatures develop in the magnetic devices (3o, 3u) or in the windings (6) thereof.

2. The method according to claim 1, characterized in that
for the case in which the bearing element (1) is operated under nominal conditions during operation in the direction of the two magnetic devices (3o, 3u), the sizes (So, Su) of the bearing gaps (10o, 10u) are regulated according to the requirement So−Su=0 by conducting currents through the windings (6) of the two magnetic devices (3o, 3u) such that identically sized bearing gaps (10o, 10u) and identical temperatures result in both magnetic devices (3o, 3u) or the windings (6) thereof.

3. The method according to claim 1, characterized in that
for the case in which the bearing element (1) is loaded more heavily during operation in the direction of one of the two magnetic devices (e.g. 3u) than under nominal conditions, a switchover occurs to regulating the sizes (So, Su) of the bearing gaps (10o, 10u) according to the requirement So−Su=a with a<0 in order to establish equilibrium; this is accomplished in that currents flow through the windings (6) of both magnetic devices (3o, 3u) such that the temperatures thereof are identical, while the sizes (So, Su) of the bearing gaps (10o, 10u) differ from each other by the dimension a.

4. The method according to claim 1, characterized in that
if more than two magnetic devices (3o, 3u, 4l, 4r) which form a plurality of pairs of magnetic devices (3o, 3u and 4l, 4r) disposed on opposite sides of the bearing element (1) are present, feedback control is carried out for all of these pairs in accordance with claim 1.

5. The method according to claim 4, characterized in that
the currents through the windings (6) of all pairs of magnetic devices (3o, 3u, 4l, 4r) are regulated without changing the particular control requirement such that all magnetic devices (3o, 3u, 4l, 4r) without the windings (6) thereof assume the same mean temperatures.

6. The method according to claim 1, characterized in that
the temperatures in the magnetic devices (3o, 3u, 4l, 4r) are determined by ascertaining the electrical resistances of the windings (6) thereof.

7. A magnetic bearing comprising a ferromagnetic, movably supported bearing element (1), at least two magnetic devices (6o, 6u) disposed on opposite sides of the bearing element (1) and equipped with windings (6), and respectively one control unit (12o, 12u) connected to the winding (6) for controlling the electrical currents flowing through the windings (6) such that during operation an equilibrium state having bearing gaps (10o, 10u) of preselected size (So, Su) sets in,
characterized in that
the control units (12o, 12u) comprise means for ascertaining operating temperatures of the magnetic devices (3o, 3u) or the windings (6) thereof and are designed to regulate the currents such that in the equilbrium state, regardless of the load situation, identical operating temperatures develop in the magnetic devices (3o, 3u) or the windings (6) thereof.

8. The magnetic bearing according to claim 7, characterized in that
the control units (12o, 12u) operate according to the requirement So−Su=0 for the sizes (So, Su) of the bearing gaps (10o, 10u) when the bearing element (1) is operated in the direction of the two magnetic devices (3o, 3u) during operation under nominal conditions.

9. The magnetic bearing according to claim 7 characterized in that
when the bearing element (1) is loaded more heavily during operation in the direction of one of the two magnetic devices (e.g. 3u) than under nominal conditions, the control units (12o, 12u) operate according to the specification So−Su=a with a<0 for the sizes (So, Su) of the bearing gaps (10o, 10u) and such that an equilibrium state is obtained; this is accomplished in that currents flow through the windings (6) of both magnetic devices (3o, 3u) such that the temperatures thereof are identical, while the sizes (So, Su) of the bearing gaps (10o, 10u) differ from each other by the dimension a.

10. The magnetic bearing according to claim 7, characterized in that
the control units (12o, 12u) each comprise at least one gap sensor (9o, 9u) for each of the two magnetic devices (3o, 3u) and one controller (15o, 15u) connected thereto, to each of which a setpoint value for the control of the gap size (So, Su) is supplied.

11. The magnetic bearing according to claim 10, characterized in that
the control units (12o, 12u) are connected to a temperature control circuit (19) which comprises inputs connected to the means for temperature measurement and to outputs that output the setpoint values.

12. The magnetic bearing according to claim 11, characterized in that
setpoint values based on the requirement So−Su=0 appear at the outputs of the temperature control circuit (19) if the two magnetic devices (3o, 3u) have the same operating temperatures, and setpoint values based on the requirement So−Su=a with a<0 appear if the two magnetic devices (3o, 3u) have different operating temperatures.

13. The magnetic bearing according to claim 7, characterized in that
it contains more than two magnetic devices, which form a plurality of pairs of magnetic devices (3o, 3u and 4l, 4r) disposed on opposite sides of the bearing element (1), and further control units (14l, 14r) connected thereto, which are set up and can be operated similar to the control units (12o, 12u) according to claim 7.

14. The magnetic bearing according to claim 13, characterized in that
the control units (12o, 12u; 14l, 14r) are set up such that the currents through the windings (6) of all pairs of magnetic devices (3o, 3u; 4l, 4r) are regulated without changing the particular control specification such that all magnetic devices (3o, 3u; 4l, 4r) assume the same mean temperatures.

15. The magnetic bearing according to claim 7, characterized in that
the operating temperatures are ascertained by way of the electrical resistances of the windings (6) of the magnetic devices (3o, 3u; 4l, 4r).

16. The magnetic bearing according to claim 7, characterized in that the bearing element (1) is a cylindrical bearing ring and the magnetic devices (3o, 3u; 4l, 4r) are disposed on the circumference of the bearing ring.

* * * * *